United States Patent [19]

Uglow et al.

[11] Patent Number: 4,505,499
[45] Date of Patent: Mar. 19, 1985

[54] ROOF DRAIN INSERT COUPLING

[76] Inventors: Malcolm S. Uglow, 78 Bloomington Cresc., Downsview, Ont., Canada, M3N 1B1; Phillip J. Uglow, 72 Gihon Spring Dr., Rexdale, Ont., Canada, M9V 4X9

[21] Appl. No.: 490,398

[22] Filed: May 2, 1983

[30] Foreign Application Priority Data

Apr. 15, 1983 [CA] Canada ................................. 425977

[51] Int. Cl.³ .............................................. E04B 5/48
[52] U.S. Cl. ........................................ 285/42; 285/338; 285/346; 403/227; 405/121; 52/199
[58] Field of Search ............... 285/42, 43, 44, 196, 285/302, 338, 345, 346, 347, 348; 52/20, 199; 404/2-5, 25; 405/119, 121; 277/112, 117, 116.2; 210/450, 116; 220/235; 248/56

[56] References Cited

U.S. PATENT DOCUMENTS

| | | | |
|---|---|---|---|
| 569,247 | 10/1896 | Smith | 285/346 |
| 689,624 | 12/1901 | Ryan | 285/346 |
| 2,237,680 | 12/1937 | Mark | 285/346 |
| 2,284,416 | 8/1940 | Gordon | 210/166 |
| 2,334,663 | 1/1941 | Whitney | 285/346 |
| 2,765,865 | 10/1956 | Schmid | 210/166 |
| 3,045,830 | 4/1958 | Fulton | 285/346 |
| 3,095,219 | 6/1963 | Tutty | 285/42 |
| 3,909,412 | 9/1975 | Patry | 210/166 |
| 3,911,635 | 10/1975 | Traupe | 220/235 |

Primary Examiner—Cornelius J. Husar
Assistant Examiner—Eric Nicholson
Attorney, Agent, or Firm—R. Brant Latham

[57] ABSTRACT

A pipe coupling device is disclosed for sealably securing a cylindrical outlet end of a roof drain insert, slidable within a larger diameter roof drain pipe, coaxially within the drain pipe. The coupling device comprises a compressible, rubber tubular member which when uncompressed is slidable into the drain pipe and which on compression by axially directed compressive forces expands radially outwardly sufficiently to sealably engage with interior surfaces of the drain pipe. The rubber tube is adapted on compression to sealably engage the drain insert. Screws which are turned to apply axial compressive forces to the rubber tube lie radially inside of the drain insert and are assessible for activation through the inlet end of the drain insert. The new pipe coupling provide a means mechanically locate the drain insert securely within an existing roof drain.

20 Claims, 7 Drawing Figures

ROOF DRAIN INSERT COUPLING

BACKGROUND OF THE INVENTION

This invention relates to roof drain inserts and more particularly to a coupling device to sealably secure a roof drain insert inside a drain pipe.

Roof drains are located in roofs of buildings to remove water from rain and melted snow therefrom. Resurfacing and repair of roofs is necessary from time to time. For example, conventional flat top asphalt roofs typically require resurfacing every 10 to 20 years. Frequently in resurfacing an existing roof, the height of the roof may be increased above that of existing roof drains, in which case, steps must be taken to ensure that water may drain from the new roof surface into the drains without entering new layers which may have been added to the roof. For example, at the time of resurfacing an existing roof, the insulative properties of the roof may wished to be increased so as to minimize heat transfer therethrough with resultant energy savings in heating and air conditioning. Adding insulative layers on top of an existing roof may significantly increase the roof height.

Where the height of the roof is increased a drain insert or extension may be required to raise the height of an existing roof drain to the height of the new roof surface so as to ensure that no water may pass between the edge of the existing drain and new layers added to the roof.

A recent development in resurfacing of roofs involves the use of sheet material to provide a new water proof layer for the roof. Such sheeting may comprise rolls of polyvinyl chloride plastic sheeting or APDM rubber sheeting which are rolled over the roof and joined together as by gluing and heat welding so as to form a continuous fluid impermeable layer. Such sheetings are not typically secured to the roof except at the their periphery and should water be permitted to get between the old roof and new sheeting, the water may flow out therebetween over the entire surface of the roof without restriction.

Entrance of water into newly added insulative layers or under new sheet material providing a new water proof layer is to be appreciated as potentially damaging, as for example, where the insulative value of the insulation may be impaired by the presence of the water therein and where possible structural damage may result with freezing.

To date, to extend an existing drain pipe, a simple drain insert with a lower portion thereof having a diameter less than the diameter of the drain pipe has been inserted axially inside the existing drain pipe. To seal the drain insert inside the drain pipe, adhesives or caulking compounds have been placed around the outside of the drain insert prior to insertion in the hope that a seal may be formed with the drain pipe. Even when particular care and time may be taken by a conscientious workman, known drain inserts suffer the disadvantage that there can be no guarantee that a seal may be formed between the drain insert and the existing drain pipe. Furthermore, such a seal as may be achieved by caulking compounds has the disadvantage of being insufficient to withstand water pressures as may be developed. The problem of water backing-up in a roof drain is not uncommon. When a roof drain may become totally blocked, or may have an inadequate flow capacity to remove a sudden accumulation of water, water may back-up in the drain to the roof with a resulting water pressure head acting on the caulking seal which the caulking cannot withstand. On even partial failure of the caulking seal, water is free to travel into the newly added roof layers, causing possibly damage and destruction.

To secure a drain insert to the roof, lag screws or long nails typically have been attempted to be extended from the top of the new drain insert through the newly added layers so as to engage a structural portion of the roof. In practise it is very difficult to ensure that the new drain insert may be securely fixed in place. Often times, there may be no convenient structural portion of the roof close to the drain insert to which the insert may be efficiently and effectively secured.

Drain inserts which are not securely fixed to a structural portion of the roof suffer the disadvantage that they have at least limited mobility and, with the passage of time, the seal between the drain insert and the new water proof layer of the roof is likely to become impaired.

SUMMARY OF THE INVENTION

Accordingly it is an object of the present invention to at least partially overcome these disadvantages of the prior art by providing a novel coupling device which permits a drain insert to be securely and sealably affixed inside a drain pipe.

Another object is to provide a coupling device which is inexpensive to manufacture and provides an efficient means to install a drain insert in a drain pipe.

Another object is to provide an improved drain insert which carries a coupling device permitting the drain insert to be conveniently sealed to a drain pipe.

Another object is to provide an improved method of securing drain inserts inside roof drain pipes.

To this end in one of its objects the present invention provides a pipe coupling device to sealably couple one end of a small diameter cylindrical pipe, slidable within a larger diameter cylindrical pipe, coaxially within the larger pipe, the coupling device comprising:

a substantially cylindrically shaped tubular member comprising fluid impermeable, compressible, elastomeric material, the tube when uncompressed being axially slidable within the larger pipe, the tube having a first portion which on compression by axially directed compressive forces expands radially outwardly sufficiently to sealably engage with interior surfaces of the larger pipe, the tube having a second tubular portion which when uncompressed is coaxially slidable into the end of the small pipe and on compression by axially directed compressive forces expands radially outwardly sufficiently to sealably engage with interior surfaces of the small pipe, means to apply axially directed compressive forces to the tube actuatable by activating means which, when the tube is positioned with the first portion coaxially inside the small pipe, the activating means lying radially inside of the small pipe and accessible for actuation through the small pipe.

In another aspect the present invention provides a pipe coupling device to couple one end of a small diameter cylindrical pipe, slidable within a larger diameter cylindrical pipe, coaxially within the larger pipe, the coupling device comprising a substantially cylindrically shaped tubular member comprising compressible, elastomeric material, the tube when uncompressed being coaxially slidable within the larger pipe and on compression thereof by axially directed compressive forces expanding radially outwardly sufficiently to sealably engage with interior surfaces of the larger pipe, a portion of the tube being adapted when uncompressed to engage the end of the small pipe and on compression of the tube by axially directing compressive forces to form a seal with the small pipe, means to apply axially directed forces to the tube actuatable by activating means which, when the tube is axially disposed within the large pipe with the portion of the tube engaging the small pipe, the activating means lying radially inside of the small pipe and accessible for actuation through the small pipe.

In yet another aspect the present invention provides a roof drain insert with a cylindrical outlet end portion slidable into a larger diameter cylindrical drain pipe, the drain insert having coupling means to securely, slidably locate the insert coaxially within the drain pipe, the coupling means comprising:

a radially inwardly directed flange on the outlet end of the insert, a tubular, ring-like member of compressible elastomeric material which when uncompressed being axially slidable within the drain pipe and on compression by axially directed compressive forces expands radially outwardly sufficiently to sealably engage with interior surfaces of the drain pipe, the ring having a portion on an axial end thereof to engage the flange and on compression by axially directed compressive forces to form a seal therewith, a washer member slidable within the drain pipe, the ring member being located axially between the flange and the washer member so as to be sandwiched therebetween, axially extending force transmitting means coupling the washer member to the flange for activation by activating means to apply axially directed compressive forces to the ring, the activating means lying radially inside of the drain insert and accessible for actuation through an inlet end of the drain insert.

The present invention provides a pipe coupling device to sealably secure a roof drain insert inside a larger diameter roof drain pipe. The coupling device and drain insert may be inserted into the roof drain pipe through the inlet of the roof drain pipe. With the coupling device and drain insert suitably located within the drain pipe, the coupling device may be activated by access through the inlet end of the drain insert so as to apply radially outwardly directed forces to the inside surfaces of the drain pipe thereby forming a seal therewith while at the same time forming a seal with the outlet end of the drain insert.

The coupling device includes a tubular member of elastomeric material which is axially sandwiched between two washer-like members coupled together by axially extending screws or other force transmitting means. The washer-like members may be drawn together thereby compressing the tubular member with axially directed compressive forces.

The tubular member is selected so that on compression within the drain pipe by axially directed compressive forces, it will expand radially outward so as to sealably engage the interior surfaces of the drain pipe.

The tubular member also has a portion thereof adapted when uncompressed to engage the outlet end of the drain insert and when axially compressed to form a seal therewith. In one embodiment, this portion of the tubular member to engage the drain insert comprises an axial end surface of the tubular member which is coupled to and engages a radially inwardly directed flange on the outlet end of the drain insert. In another embodiment the portion of the tubular member to engage the drain insert comprises a tubular portion axially slidable into the outlet end of the drain insert when uncompressed and when compressed by axially directed compressive forces expands radially outwardly to sealably engage interior surfaces of the drain insert.

The present invention also provides a method for sealably securing a cylindrical outlet end of a roof drain insert within a larger diameter drain pipe. The method involves inserting a coupling device and drain insert into the drain pipe through an inlet end of the drain pipe, locating the coupling device to engage the outlet end of the drain insert within the drain pipe, and via access through the inlet end of the drain insert actuating the coupling means so as to compress an elastomeric tubular member thereof into sealing engagement with the drain pipe and drain insert.

BRIEF DESCRIPTION OF THE DRAWINGS

Further objects and advantages of the invention will appear from the following description taken together with the accompanying drawings in which.

DESCRIPTION OF THE PREFERRED EMBODIMENTS

Figure 1:
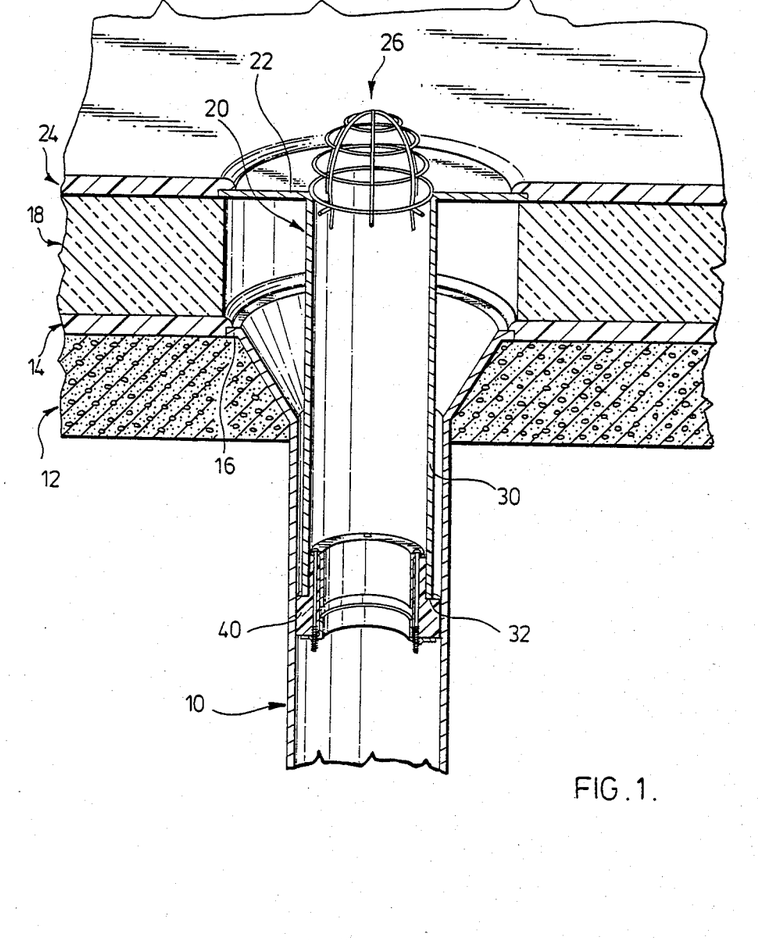
FIG. 1 shows a vertical cross-sectional through a segment of a roof showing a first preferred embodiment of the coupling device in accordance with the present invention utilized in extending a drain pipe.

Reference is made first to FIG. 1 which shows a drain pipe 10 securely embedded in the substrate 12 of a roof. For the purpose of illustration, substrate 12 is shown to be concrete. An original water impermeable sealing layer 14 is shown to overlie substrate 12 and meet with inlet flange 16 of drain pipe 10 so as to form a seal therewith. For illustration, the original sealing layer 14 has been shown as an asphalt layer which overlaps inlet flange 16 of the drain pipe 10 so as to adhere thereto and form a seal therewith.

Drain pipe 10, substrate 12 and original sealing layer 14 may be seen to comprise an original roof structure. To the original roof structure, a new insulation layer 18 has been added as shown, by way of example, to substantially increase the height of the roof. While the nature of the new insulation layer is not important, it is to be understood that it could comprise any manner of insulating materials with or without other support structures as for example a wood frame.

A new drain insert 20 is shown positioned axially inside drain pipe 10 and as having an upper inlet bordered by inlet flange 22 which extends radially outwardly of the drain insert so as to overlie the new insulation layer 18.

On top of the new insulation layer 18 a new water impermeable sealing layer 24 has been added. For convenience the new sealing layer 24 has been shown as another asphalt layer which overlies inlet flange 22 of the drain insert to form a seal therewith. As is to be appreciated, any new seal layer 24 may be utilized, including particularly sheeting material which may be bonded or welded to the inlet flange 22 or otherwise adapted to form a seal therewith.

For completeness, a removable wire strainer 26 is shown fitted snuggly in the drain the inlet opening of drain insert 20 so as to help to prevent objects such as leaves and paper materials entering the drain insert and possibly clogging the drain. It is to be appreciated by a person skilled in the art that other more complex removable strainers may be provided.

The drain insert includes a cylindrical portion or small pipe 30 which extends downwardly therefrom to an outlet end 32. Prior to coupling of drain insert 20 inside drain pipe 10, the small pipe 30 may be seen to be axially slidable within the inside of drain pipe 10.

Figure 2:
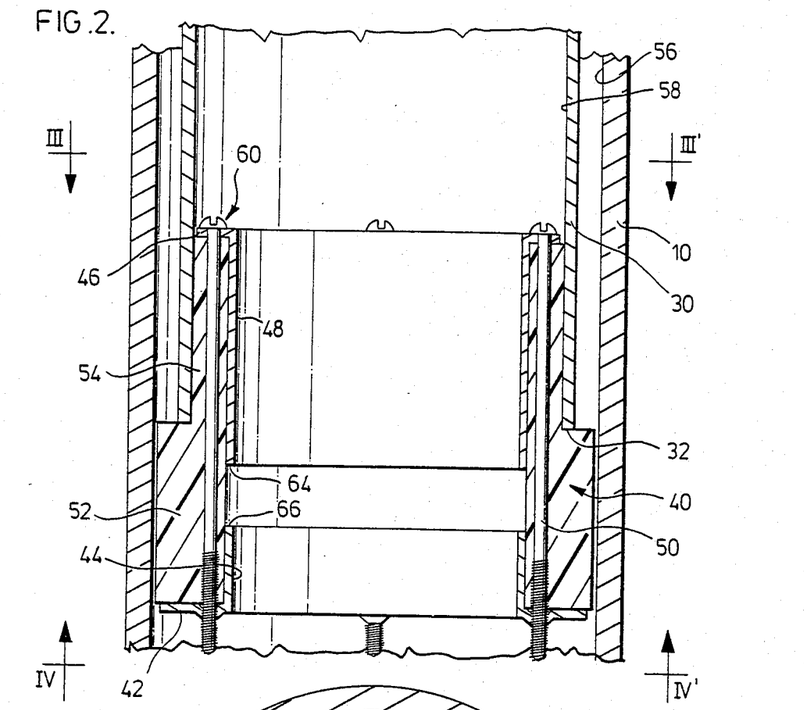
FIG. 2 is an enlarged view of a portion of FIG. 1 showing in greater detail the coupling device in accordance with the present invention.
Figure 3:
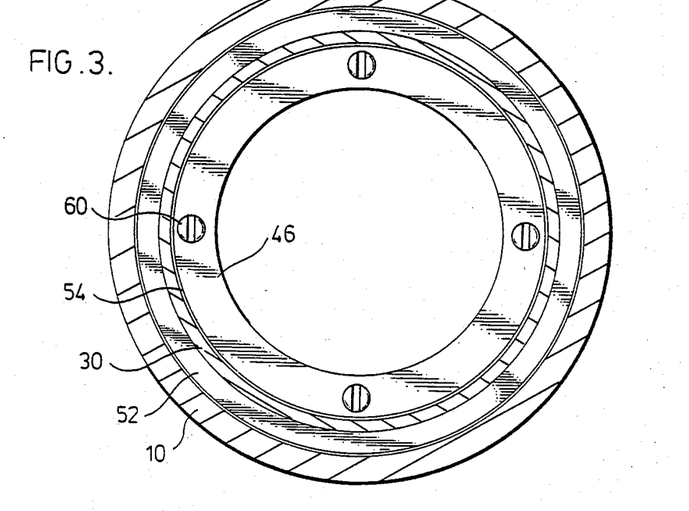
FIG. 3 is a top view of the coupling device shown in FIG. 2 from section III—III'.
Figure 4:
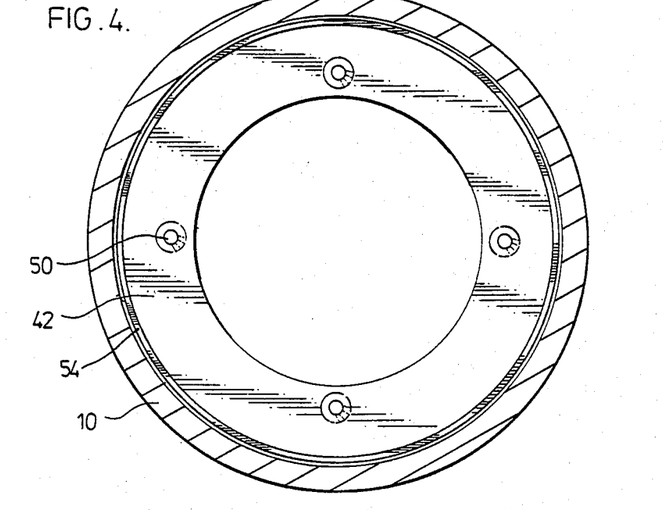
FIG. 4 is a bottom view of the coupling device shown in FIG. 2, from section line IV—IV'.

As best seen in FIGS. 2, 3 and 4 the preferred first embodiment of the coupling device in accordance with the present invention comprises a tubular member 40 with a central bore of uniform inside diameter axially therethrough. Tubular member 40 is axially sandwiched between two washer-like members. A first washer-like member 42 comprises a radially outwardly extending flange on a first cylindrical tube 44 axially received within the bore of tubular member 40 and a second washer-like member 46 comprising a radially outwardly extending flange on a second cylindrical tube 48 also axially received within the bore of tubular member 40.

Circumferentially spaced, axially extending threaded screws 50 extend through apertures in the second washer-like member 46 and through correspondingly aligned apertures in tubular member 40 so as to be threadably received in apertures in the first washer member 42.

The screws 50 serve as axially extending force transmitting means coupling the first washer-like member 42 to the second washer-like member 46 whereby, on tightening screws 50, the washer-like members are drawn together so as to compress tubular member 40 by axially directed compressive forces.

Tubular member 40 comprises a fluid impermeable, compressible elastomeric material preferably of neoprene elastomers or rubber. Tubular member 40 when uncompressed as shown in FIG. 2 is axially slidable within drain pipe 10. Tubular member 40 in the first embodiment comprises two tubular portions, a first tubular portion 52 and a second tubular portion 54. The first tubular portion 52 has a uniform outer diameter which permits it to be axially slidable inside drain pipe 10 when uncompressed. Preferably the outer diameter of the first tubular portion 52 is marginally smaller than the inside diameter of the drain pipe. The second tubular portion 54 has a uniform outer diameter, when uncompressed, which permits it to be axially slidable into small pipe 30. Preferably the outer diameter of the second portion 54 is chosen so as to provide a snug or force fit of the second portion 54 within outlet end 32 of drain insert 20 so that when uncompressed the tubular member 40 and therefore the remainder of the coupling device, may be securely carried by drain insert 20.

Each of the first portion 52 and second portion 54 are chosen so that, upon compression by axially directed compressive forces, the first portion 52 expands radially outwardly sufficiently to sealably engage the interior surface 56 of drain pipe 10 and the second portion expands radially outwardly sufficiently to sealably engage the interior surface 58 of small pipe 30. Thus, in an assembled coupling device with tubular member 40 sandwiched between washer-like members 42 and 46 and coupled together by screws 50, with the first portion 52 axially inside drain pipe 10 and the second portion 54 axially inside small pipe 30, upon tightening screws 50, the first and second portions 52 and 54 will be compressed and will expand radially outward so as to sealably engage the respective interior surfaces 56 and 58 of the drain pipe 10 and small pipe 30. Preferably the elastomeric material which comprises tubular member 40 is chosen so that the radially outwardly directed forces from the first and second portions 52 and 54 will generate sufficient frictional force so as to secure the outlet end 32 of small pipe 30 within drain pipe 10 and prevent relative movement therebetween.

As may be seen in FIG. 2, screws 50 have screw heads 60 which are located adjacent second washer 46 radially inside of small pipe 30 of drain insert 20. With wire strainer 26 removed, screw heads 60 are excessible by a workman through the inlet end of drain insert 20.

A preferred method of sealing a drain insert 20 inside a pipe drain 10 with a coupling device according to the first embodiment is now described. The drain insert is firstly assembled with the washer members 42 and 46 sandwiching tubular member 40 therebetween and coupled together by screws 50. With tubular member 40 in an uncompressed state, the second portion 54 of the tubular member 40 is inserted into small pipe 30 at the outlet end 32 of drain insert 20. Preferably the second portion 54 is of a sufficient diameter that when uncompressed it will be securely carried by the small pipe 30 upon insertion therein. The drain insert 20 carrying the assembled coupling device is next inserted into drain pipe 10. Upon location of drain insert 20 at a desired position within the drain pipe 10 and with wire strainer 26 removed, by access through the inside of drain insert 20 via the open inlet of drain insert 20, screws 50 may be tightened by activation of screw heads 60. Tightening screw 50, compresses tubular member 40 until the first and second portions 52 and 54 sealably engage the interior surfaces 56 and 58 of the drain pipe 10 and small pipe 30, respectively, thereby sealably securing the drain insert 20 within drain pipe 10.

Figure 5:
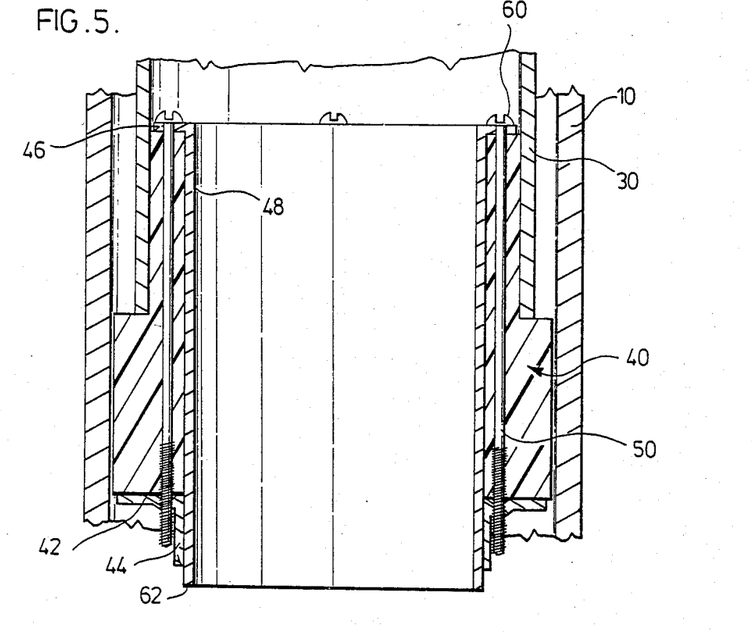
FIG. 5 shows an axial cross sectional view similar to that shown in FIG. 2 of a second preferred embodiment of the coupling device in accordance with the present invention.

Reference is now made to FIG. 5 which shows a second embodiment of the drain coupling in accordance with the present invention. The drain coupling shown in FIG. 5 is substantially identical to the drain coupling shown in FIG. 2 and like numerals have been used to indicate similar elements. The second embodiment shown in FIG. 5 differs from the embodiment in FIG. 2 in the configuration of the first tube 44 and second tube 48 from which the first and second washer-like members 42 and 46, respectively, extend as radially outwardly directed flanges. In FIG. 5, the second tube 48 extends axially throughout the entire length of the internal bore of tubular member 40 to extend therebeyond to extremity 62. The first tube 44 is disposed to extend axially away from tubular member 40 and is of an inside diameter so as to be marginally smaller than the outside diameter of second tube 48.

The configuration of FIG. 5 with tube 48 extending axially throughout the length of the bore of tubular member 40 provides an inner structural member throughout the length of tubular member 40 to oppose such radially inwardly directed forces as may arise during compression of tubular member 40. In the configuration of FIG. 5, there is no gap as seen in FIG. 2 intermediate axial ends 64 and 66 of tubes 44 and 48, respectively into which the tubular member 40 may attempt to expand upon compression thereof and possibly be pinched between ends 64 and 66.

In the embodiments of FIGS. 2 and 5, the washer-like members 42 and 46 have been shown to be circular, radially outwardly extending flanges on tubes 44 and 48, respectively. While this is a preferred configuration, it is to be appreciated that more simplified washer members may be used, for example, comprising merely plates with a central aperture therethrough which can be coupled together by screws 50 so as to axially compress tubular member 40. While such plates may preferably be circular, other configurations would prove suitable provided an assembled coupling device is axially slidable within drain pipe 10 and provided preferably the second washer 46 permits the second portion 54 of tubular member 40 to be axially slidably inserted inside small pipe 30.

Further, while washer-like members 42 and 46 have been shown as a unitary piece, a suitable washer member may merely comprise a plurality of segmented portions as, for example, individual apertured plates through which screws 50 pass and which plates extend at least marginally outwardly over the end surfaces of tubular member 40.

The washer-like members 42 and 46 are preferably made from a metal or suitably rigid plastic material. An alternative embodiment would be to provide the washer-like members as a substantially non-compressible rubber ring placed over and preferably secured as by gluing to the ends of the tubular member 40.

Figure 6:
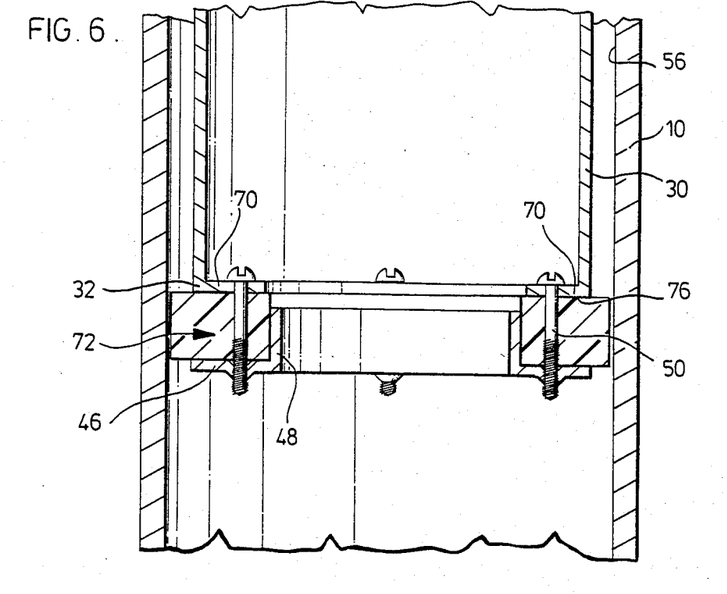
FIGS. 6 and 7 are axial cross-section views similar to that of FIG. 2 showing third and fourth preferred embodiments of the coupling device in accordance with this invention.

Reference is now made to FIG. 6 which shows a third embodiment of the present invention. The embodiment of FIG. 6 includes elements substantially identical to elements from the first embodiment shown in FIG. 2, and in FIG. 6 like numerals are used to indicate similar elements. FIG. 6 shows a similar view of a small pipe 30 of a drain insert 20 carrying a coupling device in accordance with the present invention and located within a drain pipe 10.

In FIG. 6, the small pipe 30 has at its outlet end 32 a radially inwardly extending flange 70. A ring 72 of compressible elastomeric material is provided coupled axially between flange 70 and a washer-like member 46 by screws 50 threadably received in washer-like member 46. Washer-like member 46 comprises a radiailly outwardly directed flange on a tube 44 received within a central bore in ring 72.

Ring 72 has an outside diameter so that the ring when uncompressed as shown in FIG. 6 is axially slidable in drain pipe 10 and on compression of ring 72 by axially directed compressive forces, ring 72 expands radially outwardly sufficiently to sealably engage internal surface 56 of drain pipe 10. Ring 72 has a portion thereof comprising surface 76 which is adapted to engage flange 70 of pipe 30 when uncompressed and on compression by axially directed compressive forces to form a seal with flange 70.

Figure 7:
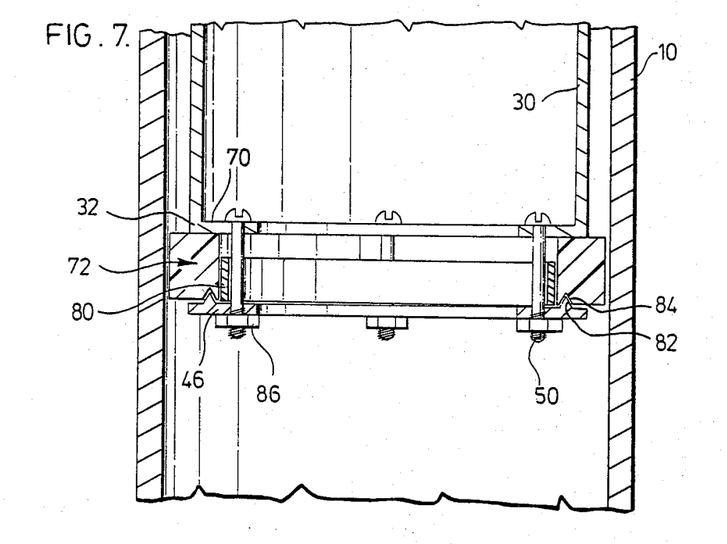

Reference is now made to FIG. 7 which shows a fourth embodiment of the present invention. The embodiment of FIG. 7 includes elements substantially identical to elements from the third embodiment shown in FIG. 6 and in FIG. 7 like numerals are used to indicate similar elements. FIG. 7 shows a similar view to that of FIG. 6 with small pipe 30 of drain insert 20 carrying a coupling device so as to locate the drain insert within drain pipe 10.

As in FIG. 6, in FIG. 7 small pipe 30 has at its outlet end 32 a flange 70 whereby via screws 50 elastomeric ring 72 may be compressed between the flange 70 and washer-like member 46. In FIG. 7, however the ring 72 does not extend radially inwardly sofar as to screws 50. A support ring 80 has been provided radially outwardly of the screws 50, radially between elastomeric ring 72 and screws 50. While support ring 80 is not necessary, it may be advantageously provided of a substantially resilient material which will oppose radially inwardly directed forces arising on compression of elastomeric ring 72. Support ring 80 may comprise a short tube of metal or plastic or a helical wire spring or coil. Support ring 80 is shown to be of reduced axial dimension as compared to elastomeric ring 72 when uncompressed so that the support ring 80 will not prevent sufficient axial compression of elastomeric ring 72. With elastomeric ring 72 of FIG. 7 not extending radially inwardly past screws 50, the ring 72 may more easily be manufactured by injection molding without the need to provide individual apertures for the screws 50.

The washer-like member 46 in FIG. 7 comprises a planar, circular washer with an annular rib 82 upstanding therefrom. This annular rib 82 mates with an annular recession 84 in the lower surface of ring 72 so as to aid retension of ring 72 on washer-like member 46 before compression of the ring 72 and also to aid radially outward expansion of ring 72 on compression. In FIG. 7, rather than having screws 50 screw directly into washer-like member 46 as in FIG. 6, a separate threaded nut 86 has been shown.

Many modifications may be made to the preferred embodiments illustrated. For example while only FIG. 7 has been shown with screws 50 radially inside ring 72, similar modifications may be made to tubular member 40 as shown in FIG. 2.

As is to be appreciated, the specific nature of the elastomeric material for the tubular member 40 of the first and second embodiments and ring 72 of the third and fourth embodiments and the configuration of the tubular member and ring will need to be selected to ensure that suitable seals with the drain pipe 10 and small pipe 30 are provided on axial compression. Means may be provided to prevent excessive compression of the tubular member 40 and ring 72. An advantageous method to prevent overtightening is to remove a segment of the threads (not shown in the drawings) from screws 50 at a predetermined distance from the ends of the screws so that the screws 50 may permit the washer-like members to be drawn towards each other only to a predetermined minimum separation. Similarly, support ring 80 of FIG. 7 could be selected to be of a suitable axial dimension to permit the elastomer ring 72 to only be compressed a given extent.

In the preferred embodiments of the present invention the tubular member 40 and ring element 72 have been provided with constant diameter outer surfaces.

These surfaces may however be of any suitable configuration, as for example, including ribs and other protruberances extending therefrom so as to sealably engage the interior surfaces of the drain pipe and drain insert upon compression. Further, each of the tubular members 40 and ring elements 72 have been shown as integral rubber elements. Other configurations which are suitable include the tubular member or ring being formed a plurality of inter-related elements and which different elements may have different elastomeric properties so as to advantageously, on compression, form a fluid impermeable barrier between areas of sealing engagement with the drain pipe and drain insert.

The preferred embodiments have been shown with a plurality of screws 50 spaced around the washer-like members by means of which the tubular members and ring are axially compressed. Such threaded screws are preferred and advantageously may axially compress the tubular member or ring substantially uniformly throughout their circumference.

FIGS. 2, 5 and 6 show the washer-like members 42, 46 and flange 70 as having planar surfaces. As shown in FIG. 7, annular ribs 82 may be provided on the washer-like member to extend into the ring 72. Such annular ribs protrusions or other configuration of the washer-like members and flanges may advantageously be provided to facilitate radially outward expansion of the tubular member 40 or ring 72 on compression thereof.

Although the disclosure describes and illustrates preferred embodiments of the invention, it is to be understood that the invention is not limited to these particular embodiments. Many variations and modifications will now occur to those skilled in the art. For a definition of the invention reference is made to the appended claims.

The embodiments of the invention in which an exclusive property or privilege is claimed are defined as follows:

1. A pipe coupling device to sealably couple one end of a small diameter cylindrical pipe, slidable within a larger diameter cylindrical pipe, coaxially within the larger pipe,
   said coupling device comprising:
   a substantially cylindrically shaped tubular member comprising fluid impermeable, compressible, elastomeric material,
   said tube when uncompressed being axially slidable within the larger pipe, said tube having a first portion which on compression by axially directed compressive forces expands radially outwardly sufficiently to sealably engage with interior surfaces of said larger pipe,
   said tube having a second tubular portion which when uncompressed is coaxially slidable into the end of the small pipe and on compression by axially directed compressive forces expands radially outwardly sufficiently to sealably engage with interior surfaces of the small pipe,
   means to apply axially directed compressive forces to said tube actuatable by activating means which, when the tube is positioned with the first portion coaxially inside the larger pipe and the second portion coaxially inside the small pipe, the activating means lying radially inside of the small pipe and accessible for actuation through the small pipe.

2. A coupling device as claimed in claim 1 wherein said means to apply axially directed compressive forces comprises:
   two washer members, a first washer member slidable within the larger pipe and a second washer member slidable within the small pipe,
   said washer members being axially spaced by said tube so as to sandwich the tube therebetween,
   axially extending force transmitting means coupling the two washer members together for actuation by said activating means to apply axially directed compressive forces to said first and second portions of the tube,
   wherein in an assembled pipe coupling device with said first portion and said first washer member inside the larger pipe and said second portion and said second washer member inside the small pipe, the actuating means lying radially inside of the small pipe and accessible for actuation through the smaller pipe.

3. A coupling device as claimed in claim 2 wherein said tube has a central bore axially extending therethrough providing communication between said larger pipe and said small pipe,
   at least one of said washer members comprising a radially outwardly extending flange on a cylindrical tube-like member axially received in said bore.

4. A coupling device as claimed in claim 3 wherein both said washer members comprise substantially rigid, radially outwardly extending flanges on cylindrical tube-like members axially received in said bore.

5. A coupling device as claimed in claim 3 wherein said axially extending force transmitting means extend through apertures in said second washer member, and through aligned apertures in said tube and said first washer member.

6. A coupling device as claimed in claim 5 wherein said axially extending force transmitting means comprise threaded screw means threadably coupled to said first washer member and with said activating means located adjacent said second washer member.

7. A coupling device as claimed in claim 6 wherein said threaded screw means has means to prevent said washer members from being drawn axially toward each other beyond a predetermined minimum distance.

8. A coupling device as claimed in claim 6 wherein said washer members comprise a material selected from a metal and a substantially rigid plastic.

9. A coupling device as claimed in claim 1 wherein said tube comprises a neoprene elastomer.

10. A coupling device as claimed in claim 1 wherein said second portion of the tube when uncompressed is coaxially slidable into the end of said small pipe to form a friction fit therewith whereby said small pipe may carry an assembled coupling device.

11. A coupling device as claimed in claim 2 wherein said tube has a coaxial bore therethrough of constant diameter,
   said first tubular portion comprises a tubular portion with a uniform outside diameter, and
   said second tubular portion comprises a tubular portion of a constant outside diameter,
   axially extending apertures extending through said tube between said bore and said outside diameters of each of said first and second portions to receive said axially extending force transmitting means.

12. A pipe coupling device for sealably securing a cylindrical outlet end of a roof drain insert, slidable within a larger diameter roof drain pipe, coaxially within the drain pipe,
   said coupling device comprising:

a substantially cylindrically shaped tubular member comprising fluid impermeable, compressible, elastomeric material, said tube when uncompressed being axially slidable within the drain pipe, said tube having a first tubular portion of a sufficient outside diameter that on compression by axially directed compressive forces expands radially outwardly sufficiently to sealably engage with interior surfaces of said drain pipe, said tube having a second tubular portion of an outside diameter which when uncompressed is coaxially slidable into said outlet end of the drain insert and on compression by axially directed, compressive forces expands radially outwardly sufficiently to sealably engage with interior surfaces of said drain insert;

two washer members, a first axially slidable within the drain pipe and a second axially slidable within the drain insert, said washers being axially spaced by said tube so as to sandwich the tube therebetween, axially extending force transmitting means coupling the two washers together for activation by activating means to apply axially directed compressive forces to said first and second portions of the tube, wherein in an assembled pipe coupling device, with said first portion and first washer coaxially inside the drain pipe and said second portion and second washer coaxially inside the outlet end of the drain insert, the activating means lie radially inside of the drain insert and are accessible for activation through an inlet end of the drain insert.

13. A coupling device as claimed in claim 12 wherein said tube has a central bore axially extending therethrough to provide communication between the drain insert and the drain pipe, and at least one of said washers comprises a substantially rigid, radially outwardly extending flange on a cylindrical tube axially received in said bore.

14. A coupling device as claimed in claim 12 wherein said tube comprises neoprene elastomer or rubber.

15. A pipe coupling device to couple one end of a small diameter cylindrical pipe, slidable within a larger diameter cylindrical pipe, coaxially within the larger pipe, said coupling device comprising a substantially cylindrically shaped member comprising compressible, elastomeric material, said cylindrically shaped member when uncompressed being coaxially slidable within the larger pipe and on compression thereof by axially directed compressive forces expanding radially outwardly sufficiently to sealably engage with interior surfaces of said larger pipe, a portion of the cylindrically shaped member being adapted when uncompressed to engage said end of the small pipe and on compression of the cylindrically shaped member by axially directing compressive forces to form a seal with said small pipe, means to apply axially directed compressive forces to said cylindrically shaped member actuatable by activating means which, when the cylindrically shaped member is axially disposed within the large pipe with said portion of the cylindrically shaped member engaging said small pipe, said activating means lying radially inside of the small pipe and accessible for actuation through said small pipe.

16. The pipe coupling device of claim 12 wherein said means to apply axially directed compressive forces to said tube comprises washer members sandwiching the tube axially therebetween and coupled together by axially extending force transmitting means actuatable by actuating means.

17. A roof drain insert with a cylindrical outlet end portion slidable into a larger diameter cylindrical drain pipe, said drain insert having coupling means to securely, slidably locate the insert coaxially within the drain pipe, said coupling means comprising;

a radially inwardly directed flange on said outlet end of the insert, a tubular, ring-like member of compressible elastomeric material which when uncompressed being axially slidable within the drain pipe and on compression by axially directed compressive forces expands radially outwardly sufficiently to sealably engage with interior surfaces of said drain pipe, said ring having a portion on an axial end thereof to engage said flange and on compression by axially directed compressive forces tb form a seal therewith, a washer member slidable within the drain pipe, said ring member being located axially between said flange and said washer member so as to be sandwiched therebetween, axially extending force transmitting means coupling the washer member to the flange for activation by activating means to apply axially directed compressive forces to said ring, said activating means lying radially inside of the drain insert and accessible for actuation through an inlet end of said drain insert.

18. A coupling device as claimed in claim 13 wherein said tube comprises neoprene elastomer or rubber.

19. A coupling device as claimed in claim 2 wherein said tube comprises a neoprene elastomer.

20. A coupling device as claimed in claim 8 wherein said tube comprises a neoprene elastomer.

* * * * *